Jan. 30, 1968 B. E. BRILEY 3,366,882

PAM AND PWM DUAL MODULATION ARRANGEMENT
FOR DOUBLING CHANNEL CAPACITY

Filed Dec. 21, 1964

INVENTOR
BRUCE E. BRILEY
BY
ATTY.

United States Patent Office 3,366,882

Patented Jan. 30, 1968

3,366,882

PAM AND PWM DUAL MODULATION ARRANGEMENT FOR DOUBLING CHANNEL CAPACITY

Bruce E. Briley, La Grange Park, Ill., assignor to Automatic Electric Laboratories, Inc., Northlake, Ill., a corporation of Delaware Filed Dec. 21, 1964, Ser. No. 420,011
11 Claims. (Cl. 325—38)

ABSTRACT OF THE DISCLOSURE

Apparatus for width modulating a pulse train, then amplitude modulating the width-modulated train to double channel capacity. An amplitude-to-width converter and filter circuit and a clamp and filter circuit are employed to recover the original modulating signals. Width modulation and amplitude-to-width conversion are accomplished by variable delay circuits which operate on the minority carrier storage principle.

This invention relates to communication systems, and in particular to an arrangement for increasing the information handling capacity of such systems, for example, time division multiplex communication systems.

The present invention provides for increasing information handling of individual channels rather than providing, for instance, additional time sharing of common apparatus, for the above example.

The primary object of this invention is to provide a new and improved arrangement for increasing the information handling capacity of communications systems.

More particularly this object is directed to providing a new and improved arrangement for doubling the capacity of each individual channel of a communication system.

Accordingly, a feature of the invention resides in the provision of means for width modulating a train of sampling pulses with a first signal, means for then amplitude modulating the width-modulated pulse train with a second signal, and means for recovering the first and second signals from the dual-modulated signal.

Another feature of the invention resides in the provision of means for converting amplitude modulations to width modulations.

These and other objects and features of the invention will become apparent and the invention will be best understood by reference to the following description taken in conjunction with the accompanying drawings in which.

Figures 1, 2:
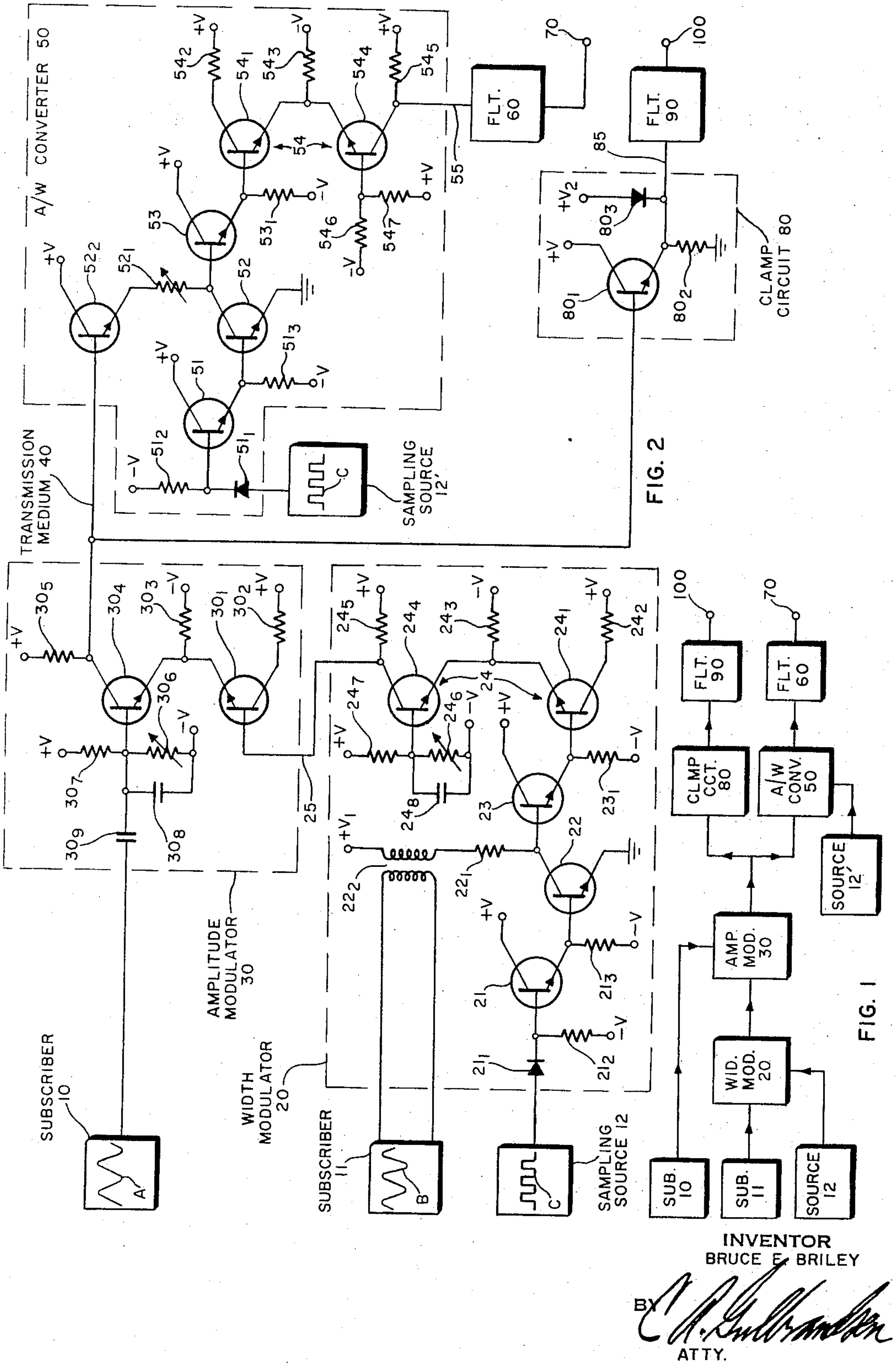
FIG. 1 is a functional block diagram of an embodiment of the invention.
FIG. 2 is a schematic representation of the embodiment of the invention according to FIG. 1.

In my co-pending United States patent applications "Delay Arrangement Using Transistor with Minority Carrier Storage," Ser. No. 365,766, filed May 7, 1964 (now United States Patent No. 3,312,839), and "Variable Time Delay Circuit Employing Transistor Utilizing Minority-Carrier-Storage Effect and Modulating A.C. Signal Bias at Collector for Determining Delay Duration," Ser. No. 386,690, filed July 31, 1964 (now United States Patent No. 3,317,755), both of which are assigned to the same assignee as the present invention, I describe transistor apparatus which take advantage of the minority carrier storage effect and the collector following phenomenon to effect time delays which are dependent on voltage magnitudes rather than the usual RC time constant type of parameters.

The embodiment of my present invention described herein utilizes a novel combination of circuits, including those discussed in my aforementioned copending patent applications, which may be employed to double channel capacity of, say telephone systems and is an improvement over the apparatus of my said copending applications. Various communication switching techniques and arrangements may be employed in conjunction with my present invention, and my present invention is not dependent on any one type of arrangement. Therefore, for clarity and simplicity of presentation, such apparatus is not discussed herein.

Referring to FIG. 1, the block diagram shows two subscriber stations 10, 11 which are sources of modulating signals, and a sampling pulse source 12, the signals to be modulated. Station 11 and source 12 are connected to width modulator 20 which is connected to an input of amplitude modulator 30. Station 10 is also connected to the amplitude modulator 30. A transmission medium 40 connects the amplitude modulator to two circuits, one including clamp circuit 80 and filter 90, and the other including the amplitude to width (A/W) converter 50, source 12' and filter 60.

Referring to FIG. 2, the width modulator 20 is seen to include an emitter follower 21, minority carrier storage circuit 22, emitter follower 23, and switching amplifier 24. Amplitude modulator 30 comprises another switching amplifier having two inputs 25 and $30_9$.

The amplitude to width converter comprises an emitter follower 51, minority carrier storage circuit 52, emitter follower 53, and swiching amplifier 54.

Clamp circuit 80 includes an emitter follower stage with a diode $80_3$ to clamp its output.

Minority carrier storage and collector following are treated in particular detail in my two aforementioned patent applications and references therein. For purpose of discussion, it will suffice here to consider minority carrier storage and collector following as matters of fact at the time of and subsequent to cut off of certain saturated transistors.

Turning again to FIG. 2, emitter follower 21 is operated by signal C from source 12 to alternately saturate and cut off. Minority carrier storage circuit 22 is operated in response to circuit 21 and is controlled by signal B from subscriber 11 to width-modulate the sampling pulse train by effecting a variable delay in accordance with the instantaneous magnitude of signal B. Signal B applied to transformer $22_2$ determines the time required for the collector of circuit 22 to rise to the instantaneous value of signal B.

Emitter follower 23 is operated by the collector action of circuit 22 and controls switching amplifier 24. Transistors $24_1$ and $24_4$ switch between saturation and cut off alternately in accordance with the width modulations of signal C. The output of the width modulator circuit 20 is via connection 25 between the collector of transistor $24_4$ and resistance $24_5$.

The width-modulated signal on conductor 25 acts as a source of sampling signals for the amplitude modulator 30 where it controls the switching amplifier to alternately cut off and saturate transistors $30_1$ and $30_4$. Signal A of subscriber 10 is amplified by circuit $30_4$ at a sampled rate according to the width-modulated signal and presented to the transmission medium, in this illustration, conductor 40.

The amplitude to width (A/W) converter 50 receives the dual-modulated signal into its minority carrier storage circuit 52 at the base of transistor $52_2$. Circuit 52 is operating in a manner similar to circuit 22 by virtue of emitter follower 51 and source 12'. Source 12' may actually be source 12 if physical distances permit. In any event source 12' provides the same pulse train C as does source 12. The delay effected at circuit 52 is dependent upon the amplitude of the dual-modulated signal, and as in modulator 20, the output of switching amplifier 54 is a width-modulated representation of the amplitude of a signal (the dual-modulated signal).

The output of A/W converter 50 is by way of connection 55 to the lowpass filter 60 where signal A is recovered and placed on terminal 70.

The dual-modulated signal is connected to the base of transistor $80_1$ of clamp circuit 80. Diode $80_3$ causes the signal developed at resistance $80_2$ to be clamped at $+V_2$ volts which is determined to be less than the minimum expected signal amplitude.

Connection 85 presents the clamped signal as a width-modulated signal to filter 90 where signal B is recovered at terminal 100.

The following components and values were incorporated in one particular design of this invention:

| | |
|---|---|
| Transistors: | |
| 21, 51 | 2N2476 |
| 22, 23, $24_1$, $24_4$, $30_2$, $30_4$, 52, $52_2$, 53, $54_1$, $54_4$, $80_1$ | 2N706 |
| Resistances: | |
| $22_1$ | 15K |
| $23_1$, $24_6$, $30_6$, $52_1$, $53_1$, $54_6$ | 10K |
| $24_7$, $30_7$, $54_7$ | 4.7K |
| $80_2$ | 3.3K |
| $24_3$, $30_3$, $54_3$ | 1K |
| $21_2$, $51_2$ | 820Ω |
| $21_3$, $51_3$ | 120Ω |
| Potentials: | |
| V ____volts__ | 6 |
| $V_1$ ____do____ | 5 |
| $V_2$ ____do____ | 3 |
| Sampling pulse ____do____ | 0–6 |

While I have described my invention with reference to a specific embodiment, this was for purpose of illustration only and should not serve to limit the scope of the invention. Many changes and modifications may be made in the invention by those skilled in the art without departing from the spirit and scope of the invention and should be included in the appended claims.

What I claim is:

1. A communication system comprising: a source of pulses; a first source of varying signal; a second source of varying signal; dual-modulation means for width modulating and amplitude modulating said pulses with said two varying signals; a transmission medium connected to said dual-modulating means for conveying the dual-modulated pulses; means connected to said transmission medium for converting the dual-modulated pulses into two series of width-modulated pulses; and means for converting the two series of width-modulated pulses into said first and second varying signals.

2. The communication system according to claim 1, wherein said dual-modulation means comprises means for width modulating said pulses and means including switching amplifier means operated by said width-modulated pulses and said second varying signal to produce the dual-modulated pulses.

3. The communication system according to claim 1, wherein said means for converting the dual-modulated pulses into two series of width-modulated pulses comprises another source of pulses, and means for converting amplitude changes of the dual-modulated pulses into width variations of said second pulses to provide one of said two series of width-modulated pulses.

4. The communication system according to claim 3, wherein said means for converting the dual-modulated pulses into two series of width-modulated pulses further comprises means for clamping the dual-modulated signal to a predetermined level to provide the other of said two series of width-modulated pulses.

5. The communication system according to claim 4, wherein said means for converting said two width-modulated pulse series into said first and second varying signals comprises low-pass filter means.

6. A communication system comprising: a source of repetitive pulses, a first source of varying signal; means connected to said two sources and operated by said pulses and said first signal to produce a pulse train that is width-modulated according to the magnitude of said first varying signal; a second source of varying signal; means connected to said width-modulating means and to said second source and operated by said width-modulated pulse train and said second signal to produce a pulse train that is further amplitude modulated according to the magnitude of said second signal; a transmission medium connected to the amplitude modulating means; and means connected to said transmission medium for demodulating the dual-modulated pulse train, said means including a first portion comprising clamping means and filter means, and a second portion comprising amplitude-to-width conversion means and filter means, said first varying signal being recovered in said first portion and said second varying signal being recovered in said second portion.

7. A communication system comprising: a source of repetitive pulses; a first source of varying signal; means for width-modulating said pulses according to the magnitude of said first varying signal, said width-modulation means comprising transistor means operated by said pulses to saturate and cut off, and including an electrode coupled to said first source of varying signal, said electrode being delayed in time from approaching its applied potential according to the instantaneous potential of said first signal thereby effecting variable delays and width-modulation of said repetitive pulses; a second source of varying signal; means controlled by said second varying signal to amplitude modulate said width modulated pulses; a transmission medium connected to the amplitude modulating means for conveying the dual-modulated pulses; and means connected to said transmission medium for demodulating said dual-modulated pulses to recover said first and second varying signals.

8. The communication system according to claim 7, wherein said amplitude-modulation means comprises switching amplifier means including an input for receiving said width-modulated pulses and an input for receiving said second varying signal.

9. A communication system comprising: a source of repetitive pulses; a first source of varying signal; means controlled by said first signal to width-modulate said pulses; a second source of varying signal; means controlled by said second signal to amplitude-modulate said width-modulated pulses; a transmission medium connected to the amplitude modulating means for conveying the dual-modulated pulses; and means connected to said transmission medium for recovering said second varying signal, said means comprising a source of repetitive pulses, transistor means operated by said pulses to saturate and cut off and including an electrode coupled to said transmission medium, said electrode being delayed in time at cut off from approaching its applied potential according to the instantaneous potential of said dual-modulated pulses, whereby amplitude changes of said dual-modulated pulses are converted to width-modulations of the last-mentioned repetitive pulses, and filter means for recovering said second signal from the last-derived width-modulated pulses.

10. The communication system according to claim 9, wherein said amplitude-modulation means comprises switching amplifier means including an input for receiving said width-modulated pulses; and an input for receiving said second varying signal.

11. The communication system according to claim 9, and further comprising means for recovering said first varying signal including means coupled to said transmission medium for clamping said dual-modulated signal to a predetermined level and means for filtering the clamped signal to recover said first varying signal.

References Cited

UNITED STATES PATENTS

| | | | |
|---|---|---|---|
| 2,838,734 | 6/1958 | Uphoff | 332—9 |
| 2,952,812 | 9/1960 | Klein et al. | 332—9 X |
| 3,317,755 | 5/1967 | Briley | 307—88.5 |

ROBERT L. GRIFFIN, *Primary Examiner.*

JOHN W. CALDWELL, *Examiner.*

J. T. STRATMAN, *Assistant Examiner.*